April 17, 1956     L. E. ELLISON ET AL     2,741,920
TEMPERATURE COMPENSATING TIRE PRESSURE GAUGE
Filed Nov. 10, 1954                     2 Sheets-Sheet 1
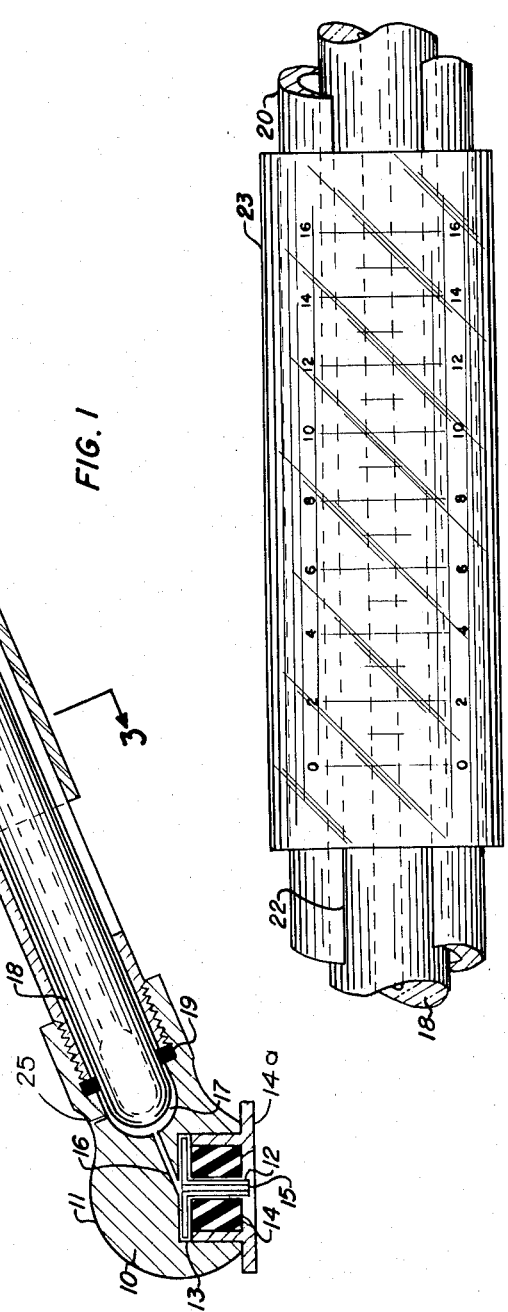
INVENTORS.
LYNN E. ELLISON
BY OTTO J. WOLFER
ATTORNEY

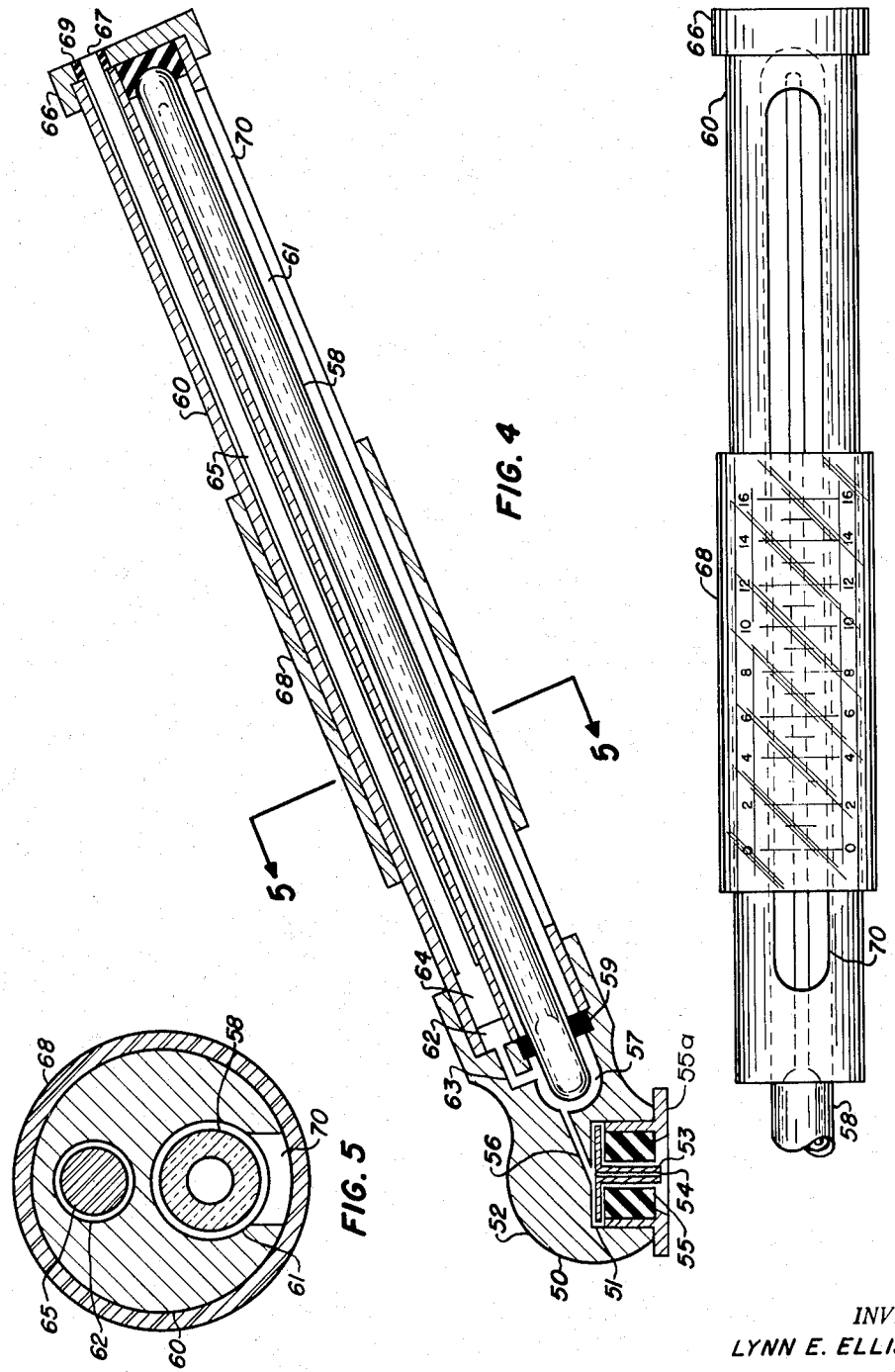

United States Patent Office 2,741,920
Patented Apr. 17, 1956

2,741,920

TEMPERATURE COMPENSATING TIRE PRESSURE GAUGE

Lynn E. Ellison, Crystal Lake, and Otto J. Wolfer, Park Ridge, Ill., assignors to The Pure Oil Company, Chicago, Ill., a corporation of Ohio Application November 10, 1954, Serial No. 468,058

4 Claims. (Cl. 73—345)

This invention relates to a temperaure compensator for use in connection with a pressure gauge employed in determining the pressure within a pneumatic vehicular tire.

Inasmuch as the air under pressure within a pneumatic vehicular tire supports the weight of a vehicle, the air itself is considered as one of the essential parts of a tire assembly. Due to its flexible nature, it yields to irregularities in roadways and cushions the ride. Accordingly, an important factor in the design of a tire is the inflation pressure of the air contained within the tire. Maximum service will be obtained if the correct tire pressure is maintained because improper inflation is a major cause of shortened tire life. Over-inflation or under-inflation causes the tires to wear rapidly and may make them unsafe thousands of miles short of the mileage expectancy of a tire operated at the designed air pressure. In selecting a temperature which is to be used as a norm in establishing tire inflation pressure, tire designers select the ambient atmospheric temperature. Thus in checking the tire inflation pressure to determine if the correct design pressure is being used, the air within the tire should be at the ambient atmospheric temperature. It is obvious that a pneumatic vehicular tire in use will develop, through friction with the roadway, a temperature considerably in excess of atmospheric temperature. Therefore, if the condition of the tire in use is periodically checked in the routine servicing of an automotive vehicle enroute, a pressure in excess of the normal design tire inflation pressure will be encountered. As a result of this incremental pressure increase, there is a tendency for automotive vehicular operators to reduce the pressure of the heated tire under these conditions. If this practice is adhered to, it results in an improper tire inflation pressure inasmuch as incremental pressure increases over the design inflation pressure were taken into consideration in the manufacture of the tire. Attempts have been made to resort to electrical thermometers in the nature of thermocouples to record the temperature existing within the tire body. However, the use of such thermal elements requires expensive associated equipment such as meters, electrical connections and the like which make the tire temperature indicator of this sort cumbersome, expensive and unadaptable for routine service work carried out by unskilled automotive service station operators.

It is therefore an object of this invention to provide an inexpensive and convenient device for determining the effect of temperature on tire inflation pressure. It is another object of this invention to provide an economical and simple apparatus especially adapted for service station operations which can be employed to measure the incremental tire pressure increase which may occur during use of the tire to permit determining what the tire pressure would be' under normal atmospheric pressure.

Figure 1 is a cross-sectional view of a temperature compensator which is to be used as a complementary accessory for a separate tire pressure gauge.

Figure 2 is a fragmentary view showing the relationship of the temperature compensator scale to the thermometer which is employed is determining the temperature of the air within the tire.

Figure 3 is a cross-sectional view taken through line 3—3 in Figure 1.

Figure 4 is a combination apparatus in which a thermometer and tire pressure gauge are provided in a unitary instrument.

Figure 5 is a cross-section view taken through line 5—5 of Figure 4.

Figure 6 is a fragmentary view showing the relationship of the temperature compensator slide to the thermometer employed in the apparatus.

From the drawings it is seen that the subject invention in essence comprises the combination of a thermometer mounted on a tire valve chuck and a scale, calibrated in terms of incremental pressure increase due to temperature rise, slidably mounted on the apparatus to permit the co-registering of the calibrated scales of the temperature compensator and the thermometer. The simplest form of the invention is illustrated in Figure 1 where it is seen that a conventional tire pressure gauge chuck 10 is adapted to provide the head of the device. The chuck body 11 contains a valve stem depressor 12 which is mounted within chamber 13 and held in place by a gasket 14 which is fabricated from a resilient type of material, such as rubber or the like. The gasket 14 is held within chamber 13 by means of gasket retainer 14a which comprises a tubular body having an inwardly directed flange upon which the gasket 14 rests. The retainer 14a may be held in place in the chuck chamber by a press fit, as illustrated, or other conventional connection means such as suitably threading the male and female elements of the assembly, or other similar expedients. A longitudinal passageway 15 is provided in the valve stem depressor 12. This passageway 15 co-registers with passageway 16 which leads into thermometer well 17. An ordinary thermometer, such as a mercury-in-glass thermometer, 18 is mounted within the thermometer well. Air leakage from around the wall of the thermometer is prevented by providing a suitable packing 19 in the annular space between the thermometer well wall and the thermometer wall. In the embodiment shown in Figure 1, it will be seen that this packing, which may be in any suitable form such as cork, felt, rubber, cotton string, etc., is retained in place by means of the tubular sheath 20 which encases the thermometer 18. The end of the sheath which is mounted in the tire chuck body is threaded and engages with the internally threaded neck section of the tire chuck body, functioning as a packing gland. The sheath 20 is provided with a cap 21 which encloses the tubular sheath. A longitudinal sight port 22 registering with the scale of the thermometer 18 is installed in the wall of the tubular sheath 20. A temperature compensator scale is slideably mounted on the tubular sheath 20. This scale is provided with suitable calibrations such as those shown in Figure 2 which represent incremental pressure increases resulting from variations in temperature. The divisions on the scale 23 are calibrated so as to be consonant with the calibrations on the thermometer 18. To prevent the slide from becoming disengaged from the device suitable flanges are provided at the terminal ends of the tubular sheath 20. These flanges may consist of a shoulder formed by the sheath 20 and tire chuck body 11 at one end, and the skirt of cap 21 at the other end. However, other equivalent expedients will be obvious to those skilled in the art. It is also to be noted that cap 21 may be provided with a filler 24 which engages with an end of thermometer 18 to hold it in a semi-rigid position. This cushion may be any resilient material such as cork, rubber, felt, or the like. It is also to be noted that the chuck body 11 is provided with a vent hole 25, or vent holes, which permits the air at atmospheric temperature to be flushed from the thermometer well by the air from the tire so that the ambient atmosphere around the thermometer bulb is at the same temperature as the air within the tire. The diameter of the vent should be sufficiently small so as to permit the air which accumulates in the thermometer well during non-use of the device to be flushed out by the incoming air from the tire without inimically affecting the tire pressure. For example, a vent 0.004–0.005 in. in diameter should suffice although vents of other diameters may be used.

In employing the embodiment of this invention illustrated in Figure 1 as a tire pressure corrector, the atmospheric temperature is first noted by means of thermometer 18. The device is then mounted on the valve of an inflated tire in such a manner as to permit the valve stem depressor 12 to unseat the valve stem of the tire valve and permit air to flow from the tire into the thermometer well 17. The temperature of the air within the tire is then noted on thermometer 18. The zero calibration of the temperature compensator scale is then positioned to correspond with the calibration of the thermometer indicative of the atmospheric pressure. With the scale maintained in this position, the calibration opposite the temperature reading of the air within the tire indicates the incremental pressure increase which was due to the increase in temperature over the atmospheric temperature originally noted. The tire pressure is also taken at this time by means of a suitable tire pressure gauge. In order to determine the inflation pressure at atmospheric temperature, the incremental pressure increase is subtracted from the gauge reading obtained from the tire pressure gauge. Thus from the true reading, it can be determined whether or not it is necessary to add more air or withdraw air from the tire in order to have the proper tire inflation pressure, for which the tire was designed, contained within the tire.

The subject invention is also adaptable to being employed in combination with a tire pressure gauge. An example of a unitary device embodying a temperature compensator and a pressure gauge is shown in Figure 4. In this form of the invention a tire valve chuck 50 is provided with a chamber 51 within the tire chuck body 52. Mounted in the chamber is a valve stem depressor 53 which is provided with a passageway 54 which enters into chamber 51. A gasket 55 prepared from a resilient material, such as rubber, or the like, is also fitted in the chamber 51 of chuck body 52 to permit an airtight connection to be made with a tire valve and held in place by retaining ring 55a. A passageway 56 interconnects chamber 51 with thermometer well 57. Mounted in thermometer well 57 is an ordinary thermometer 58, e. g., a mercury-in-glass thermometer. An airtight seal between the tire chuck body 52 and the thermometer is provided by means of a suitable packing 59. In the embodiment shown in Figure 4, a cement for joining metal to glass is employed. Examples of suitable cements include resinous cements such as De Khotinsky cement, Chatterton's compound, sealing waxes, etc. or other types of cements, such as litharge cement. Mechanical means, such as packing glands, may also be employed for mounting the thermometer 58 within the thermometer well 57 to provide an airtight seal. Other alternatives will also be obvious to those who are skilled in the art. Mounted on the chuck body 52 is a double-barreled sheath 60 which encases thermometer 58 in barrel 61. Also provided in sheath 60 is barrel 62 which communicates with chamber 51 by means of passageway 63, thermometer well 57 and passageway 56. Reciprocally mounted in barrel 62 is piston 64 which has affixed thereto a slide 65 calibrated in terms of pressure, e. g., pounds per square inch. Enclosing sheath 60 is cap 66. Cap 66 has an opening 67 which registers with barrel 62 and provides an outlet for the calibrated slide 65 which moves outwardly when pressure is applied to piston 64. This opening may also be provided with a grommet 69 which functions as a bearing for slide 67. The slide 65 shown in Figure 4 has a round cross-section. However, other geometrical cross-sections may also be employed depending upon the desires of those who are employing the teaching of this invention. Slideably mounted on sheath 60 is temperature compensator scale 68. This scale consists of a tubular element which is calibrated in terms of pressure increase resulting from increases in temperature. The calibrations which are consonant with the calibrations of the thermometer 58 are read in conjunction therewith through the longitudinal sight port 70 which is provided in sheath 60 providing visual access to barrel 61. Suitable flanges are also provided on the sheath of the device such as the shoulder formed by the chuck body 52 and sheath 60, and skirt of cap 66 and sheath 60, to avoid inadvertently disengaging the scale 68 from sheath 60.

This combination apparatus is utilized in the same manner as the more simple embodiment hereinbefore described. The tire valve chuck is brought into engagement with the tire valve by inserting the valve stem depressor 53 within the tire valve opening thus depressing the tire valve stem and permitting air within the tire to enter into chamber 51 thus forcing piston 64 outwardly in an amount corresponding to the tire pressure. In addition, the air in chamber 51 enters into thermometer well 57 and the temperature of this air is recorded by means of thermometer 58. Passageway 63 which interconnects thermometer well 57 with barrel 62 also serves as a means for flushing the cooler air normally present in thermometer well 57. The scale 68 is adjusted on sheath 60 so that the zero calibration corresponds with the calibration on the thermometer which is indicative of the ambient atmospheric temperature. The calibration of scale 68 which is opposite the temperature reading provided by the air within the tire then indicates that portion of the total pressure which is due to the temperature of the air in the tire in excess of the normal atmospheric temperature. The pressure increment thus obtained is then subtracted from the pressure reading recorded by the calibrations on slide 65 co-operating with the outer face of cap 66 which is used as an index for the calibrations. The net pressure obtained in this manner is the pressure that would occur in the tire at normal atmospheric temperature. Thus air may be introduced into or withdrawn from the tire in order to provide the proper inflation pressure for which the tire was designed to operate.

In fabricating a device in accordance with this invention, it is necessary to employ a sensitive type thermometer consisting of a transparent, or translucent tube of capillary bore with a bulb blown at one end and sealed at the other. It may contain mercury, alcohol, or some other confinable substance whose volume changes with a change in temperature. The thermometric tube may be fabricated from glass, quartz, or other similar substances. In the appended claims the term thermometer is intended to connote such an instrument. This thermometer may have applied thereon the conventional temperature graduations or may be ungraduated but calibrated in conjunction and cooperation with the temperature compensator scale graduations. Even under adverse conditions of operation in hot climates and under prolonged use, the temperature in a properly designed tire seldom exceeds 200° F. On the other hand normal atmospheric temperatures are not generally lower than about 0° F. Therefore, thermometers which have calibration ranges within these limits may be employed. It may, however, be desirable to employ thermometer having a narrow temperature range for special testing purposes. It therefore is to be understood that the temperature range of the thermometer which is employed in the subject invention will depend upon the type of service in which the instrument is to be used and its selection can be readily made by anyone skilled in the art.

The temperature compensator scale is calibrated in units of pressure consonant with the temperature calibration of the thermometer which is employed. It is well known that if a volume is kept constant, the pressure will increase in proportion to the absolute temperature. Within the range of pressures encountered in a pneumatic vehicular tire during its normal use, the volume will remain substantially constant. Therefore, the pressure calibrations on the temperature compensator scale are made proportional to the temperature calibration of the thermometer employed in the apparatus. The calibrated temperature compensator scale may be made of any suitable material, such as plastic, metal, wood or the like or in any form adaptable to being slideably mounted in cooperation with the thermometer element of the apparatus. The calibrations may be inscribed directly on the scale or on a transparent insert which is fitted to the temperature compensator scale. It may be also desirable to mount the temperature compensator scale on the sheath encasing the thermometer in such a manner as to prevent its rotation about the axis of the sheath and to retain the calibrations in registration with the sight port of the sheath. In the combination apparatus, rather than employing slideable-scale-type of pressure gauge described above, the subject invention may also be modified to employ a dial-type, pressure-responsive mechanism such as those which employ bellows, Bourbon tubes or the like, to indicate pressure. Also to facilitate the use of the instrument of this invention, a double-head tire valve chuck may also be employed. It is also to be understood that the subject invention includes within its scope the use of an uncased thermometer mounted on a suitable tire chuck and having slideably mounted thereon a suitably calibrated temperature compensator scale. It is preferred, however, to employ a sheath encasing the thermometer to avoid accidental breakage of the thermometer. Any suitable material of construction may be employed in the construction of the apparatus. The selection of such materials will, of course, depend upon the desires of those who are taking advantage of the subject invention. These materials are those conventionally used in the fabrication of devices of this nature except where it is specifically stated to the contrary. It is preferred that a substance having a low co-efficient of thermal conductivity such as a plastic composition, hard rubber, etc., be used for fabricating the apparatus of this invention to preclude or minimize heat loss by radiation during use of the device.

Other modifications and variations of the invention as hereinbefore described will be obvious and may be made without departing from the purview of this invention. Accordingly, only such limitations should be made as are indicated in the appended claims.

We claim as our invention:

1. A temperature compensator for use in determining the pressure/temperature relationship occurring in a pneumatic vehicular tire under service conditions and relating said pressure/temperature relationship to the pressure/temperature relationship occurring at ambient atmospheric temperatures, which comprises a pneumatic tire valve chuck, a thermometer well mounted therein, said chuck having a passage therein permitting air to flow from an inflated vehicular tire to said well when said chuck is applied to the valve of such vehicular tire, a thermometer installed in said well in fluid-tight relationship therewith, and a temperature compensator scale cooperating with said thermometer and slideably mounted coaxially with the longitudinal axis of said thermometer, said temperature compensator scale containing indicia calibrated in units of pressure related to variations in temperature under conditions of constant volume, said calibration being consonant with the temperature calibrations on said thermometer.

2. A temperature compensator for use in determining the pressure/temperature relationship occurring in a pneumatic vehicular tire under service conditions and relating said pressure/temperature relationship to the pressure/temperature relationship occurring at ambient atmospheric temperatures, which comprises a pneumatic tire valve chuck, a thermometer well mounted therein, a means for withdrawing air from an inflated vehicular tire and transferring said air to said thermometer well, a thermometer installed in said well in fluid-tight relationship therewith, a tubular sheath mounted on said chuck and encasing said thermometer, said sheath having a sight port provided therein in registration with the calibrations of said thermometer, a temperature compensator cooperating with said thermometer slideably mounted on said sheath, said temperature compensator scale containing indicia calibrated in units of pressure related to variations in temperature under conditions of constant volume, said calibration being consonant with the temperature calibrations on said thermometer.

3. A temperature compensator for use in determining the pressure/temperature relationship occurring in a pneumatic vehicular tire under service conditions and relating said pressure/temperature relationship to the pressure/temperature relationship occurring at ambient atmospheric temperature, which comprises a pneumatic tire valve chuck, a thermometer well and a pressure-responsive means for measuring pressure mounted thereon, a means for withdrawing air from an inflated vehicular tire and transferring said air to said thermometer well and said pressure-responsive means, a thermometer installed in said well in fluid-tight relationship therewith, and a slideably mounted temperature compensator scale cooperating with said thermometer, said temperature compensator scale containing indicia calibrated in units of pressure related to variations in temperature under conditions of constant volume, said calibration being consonant with the temperature calibrations on said thermometer.

4. A temperature compensator for use in determining the pressure/temperature relationship occurring in a a pneumatic vehicular tire under service conditions and relating said pressure/temperature relationship to the pressure/temperature relationship occurring at ambient atmospheric temperature, which comprises a pneumatic tire valve chuck, said chuck containing a thermometer well, a tubular sheath mounted on said chuck, said sheath containing a first and a second longitudinally positioned barrel, said first barrel registering with said thermometer well, a means for withdrawing air from an inflated vehicular tire and transferring said air to said thermometer well and said second barrel, a thermometer installed in said well in fluid-tight relationship therewith and encased within said first barrel, a sight port in said sheath communicating with said first barrel substantially throughout its entire length, a piston disposed in said second barrel, a pressure-calibrated slide mounted thereon, a temperature compensator scale slideably mounted on said sheath and cooperating with said thermometer, said temperature compensator scale containing indicia calibrated in units of pressure related to variations in temperature under conditions of constant volume, said calibration being consonant with the temperature calibrations on said thermometer.

References Cited in the file of this patent
UNITED STATES PATENTS

| 2,239,221 | Dinmack | Apr. 22, 1941 |
| 2,614,429 | Welsh et al. | Oct. 21, 1952 |